(12) United States Patent
Kitley et al.

(10) Patent No.: US 6,170,306 B1
(45) Date of Patent: Jan. 9, 2001

(54) VALVE SECURITY GUARD

(76) Inventors: Dean E. Kitley, 1675 Texas Ave., Hardy, IA (US) 50545; David M. Christianson, 209 19th St. SW., Humboldt, IA (US) 50548

(*) Notice: Under 35 U.S.C. 154(b), the term of this patent shall be extended for 0 days.

(21) Appl. No.: 09/311,675

(22) Filed: May 13, 1999

(51) Int. Cl.[7] .................................................. F16K 35/00
(52) U.S. Cl. .............................. 70/178; 70/212; 137/382
(58) Field of Search ...................... 70/175–180, 207–209, 70/212; 137/382

(56) References Cited

U.S. PATENT DOCUMENTS

| | | | | |
|---|---|---|---|---|
| 1,714,856 | * | 5/1929 | Douglas | 70/212 X |
| 1,829,444 | * | 10/1931 | Goebel et al. | 70/212 X |
| 1,986,128 | * | 1/1935 | Trott | 70/212 |
| 2,316,956 | * | 4/1943 | Heath | 70/180 |
| 2,706,900 | * | 4/1955 | Johnson | 70/178 |
| 2,838,064 | * | 6/1958 | Schieberl | 70/175 X |
| 4,024,740 | * | 5/1977 | DiGiovanni | 70/178 X |
| 4,062,208 | * | 12/1977 | Nielsen, Jr. | 70/178 |
| 4,069,692 | * | 1/1978 | Hemphill | 70/212 X |
| 4,428,395 | * | 1/1984 | Bravo | 70/180 X |
| 4,450,697 | * | 5/1984 | Ellis | 70/178 |
| 4,538,434 | * | 9/1985 | Janzen, Sr. et al. | 70/212 X |
| 4,648,254 | * | 3/1987 | Bloemers | 70/212 X |
| 4,681,134 | * | 7/1987 | Paris, Sr. | 70/212 X |
| 4,781,044 | * | 11/1988 | Ortega | 70/177 |
| 4,798,066 | * | 1/1989 | Solow | 70/212 |
| 5,425,256 | * | 6/1995 | Crosby | 70/212 X |
| 5,794,463 | * | 8/1998 | McDaid | 70/58 X |
| 5,950,462 | * | 9/1999 | Neeley | 70/178 X |
| 5,987,938 | * | 11/1999 | Frei | 70/58 X |

FOREIGN PATENT DOCUMENTS

| | | | | |
|---|---|---|---|---|
| 466917 | * | 8/1950 | (CA) | 70/178 |
| 540577 | * | 6/1932 | (DE) | 70/178 |
| 227400 | * | 1/1925 | (GB) | 70/178 |
| 283058 | * | 3/1932 | (GB) | 70/178 |
| 368453 | * | 3/1932 | (GB) | 70/178 |

* cited by examiner

*Primary Examiner*—Suzanne Dino Barrett

(57) ABSTRACT

A valve security guard is provided for a storage tank having a valve for dispensing material from the tank and includes a cover with a closed end and an interior with an open end for enclosing a valve handle, and a shaft member that extends through apertures in the cover that is lockable in a fixed position located behind the valve handle to secure the cover thereon.

8 Claims, 5 Drawing Sheets

VALVE SECURITY GUARD

Background of the Invention

1. Field of the Invention

The present invention relates in general to a security guard for a valve on a storage tank and more specifically concerns high strength valve guards that serve as a deterrent to the theft of toxic or hazardous materials.

2. Description of the Prior Art

Various types of valve security guards are known in the art for placement over valves and other regulating type devices used on storage containers to prevent any unlawful operation thereof. Examples of these prior art devices are disclosed in U.S. Pat. Nos. 4,380,247; 4,513,773; 4,254,888 and 4,899, 781. Although the guards disclosed in such patents are useful for their designed purpose, none of them are structured to prevent unauthorized use of a dispensing valve for an anhydrous ammonia storage tank.

SUMMARY OF THE INVENTION

The present invention provides a valve security guard for a storage tank having a valve for dispensing material from the tank, which valve includes a valve casing, a valve stem that extends outwardly from the casing and an operating handle at the outer end of the stem. The security guard is primarily formed from a cover with a closed end and an interior with an open end for enclosing the valve handle and means for securing the cover on said handle. The securing means is formed of apertures in said cover and an elongated shaft member that extends through said apertures and is lockable in a fixed position located behind the handle to secure the cover thereon.

The cover interior has inner and outer chambers formed in a tiered configuration so that the outer chamber has a diameter greater than the inner chamber to define a circular interior ledge and the handle is received in the inner chamber. Preferably, a slip ring that is sized to be received within the inner chamber of said cover is located intermediate the valve handle and the periphery of the inner chamber. Further, the guard includes a shield means with a central opening through which the valve stem can be positioned. The shield means is of a size for being positioned within said outer chamber of the cover interior to seat against the interior ledge for substantially closing off the inner chamber to increase the security of the guard.

The foregoing and other advantages of the present invention will appear from the following description. In the description, reference is made to the accompanying drawings, which form a part hereof, and in which there is shown by illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DETAILED DESCRIPTION OF THE PREFERRED EMBODIMENT

Figure 1:
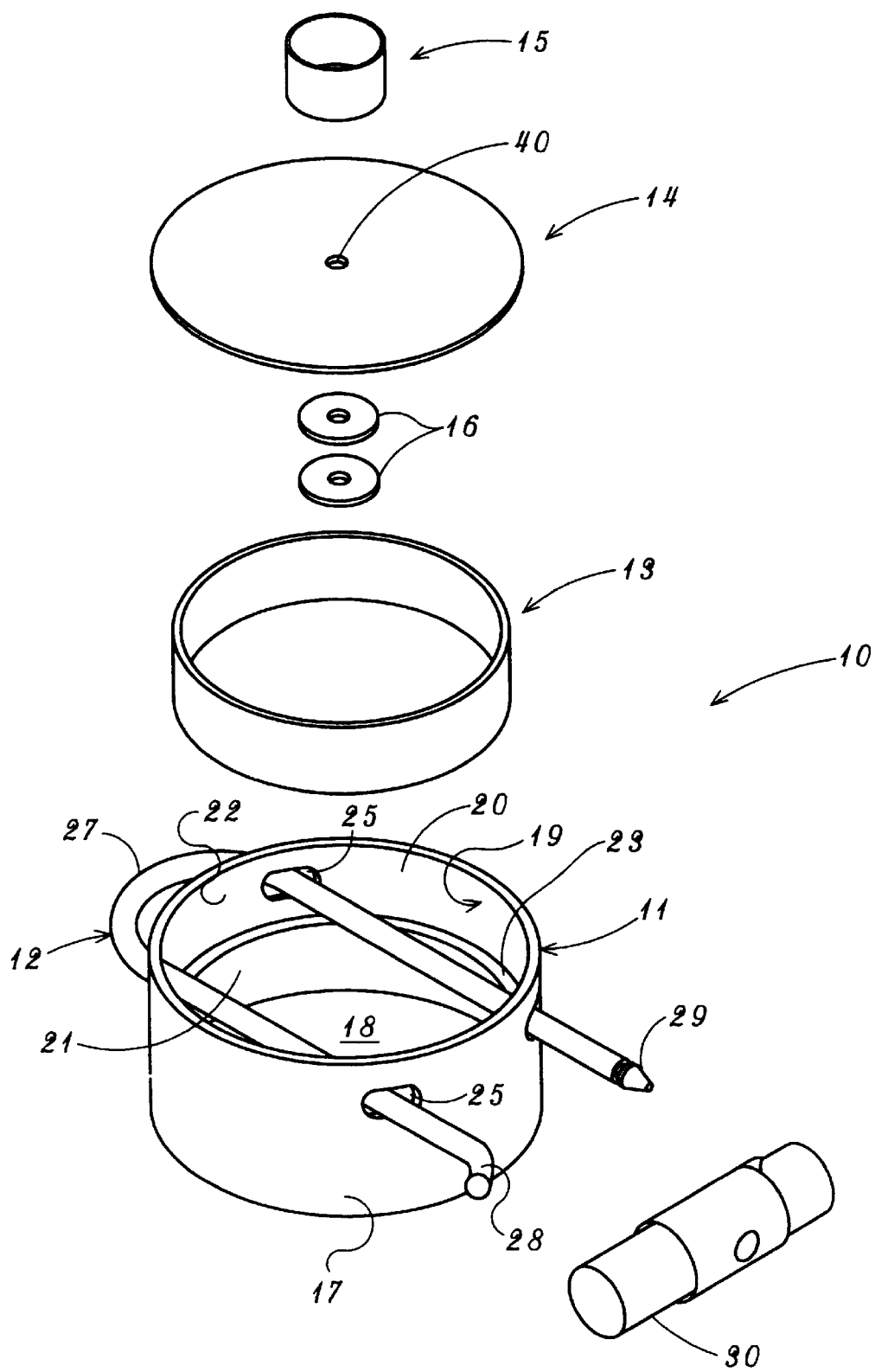
FIG. 1 is an exploded perspective view of a preferred embodiment of the valve security guard of the present invention.

The present invention is designed to provide a valve security guard shown generally at 10 in FIG. 1 for a storage tank. The security guard 10 is particularly appropriate for use with storage tanks holding toxic or other dangerous materials as the structure of the guard is made of high strength and tamper resistant materials in order to provide a highly effective securement device.

The security guard 10 principally includes a cover 11 and an elongated U-shaped shaft member 12 designed to coact together to retain the cover in a fixed position on the handle. In addition to the cover 11 and shaft member 12, the security guard 10 preferably includes a slip ring 13, a disk shaped shield means 14 and a shield ring 15 in addition to spacing washer 16 as needed, all for the purposes as described below.

Figure 2:
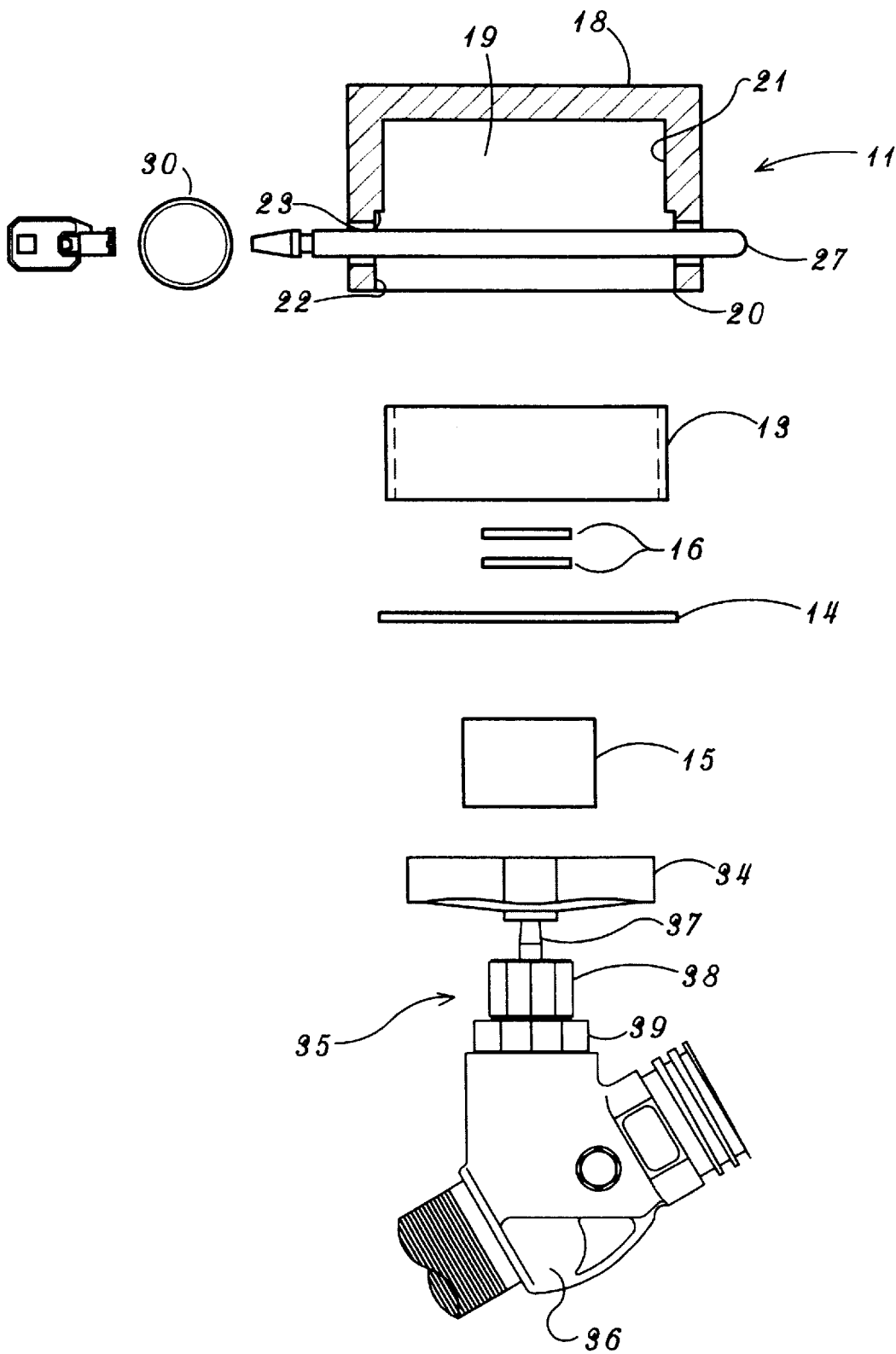
FIG. 2 is an exploded side view of the security guard of FIG. 1 shown together with a valve assembly.
Figure 3:
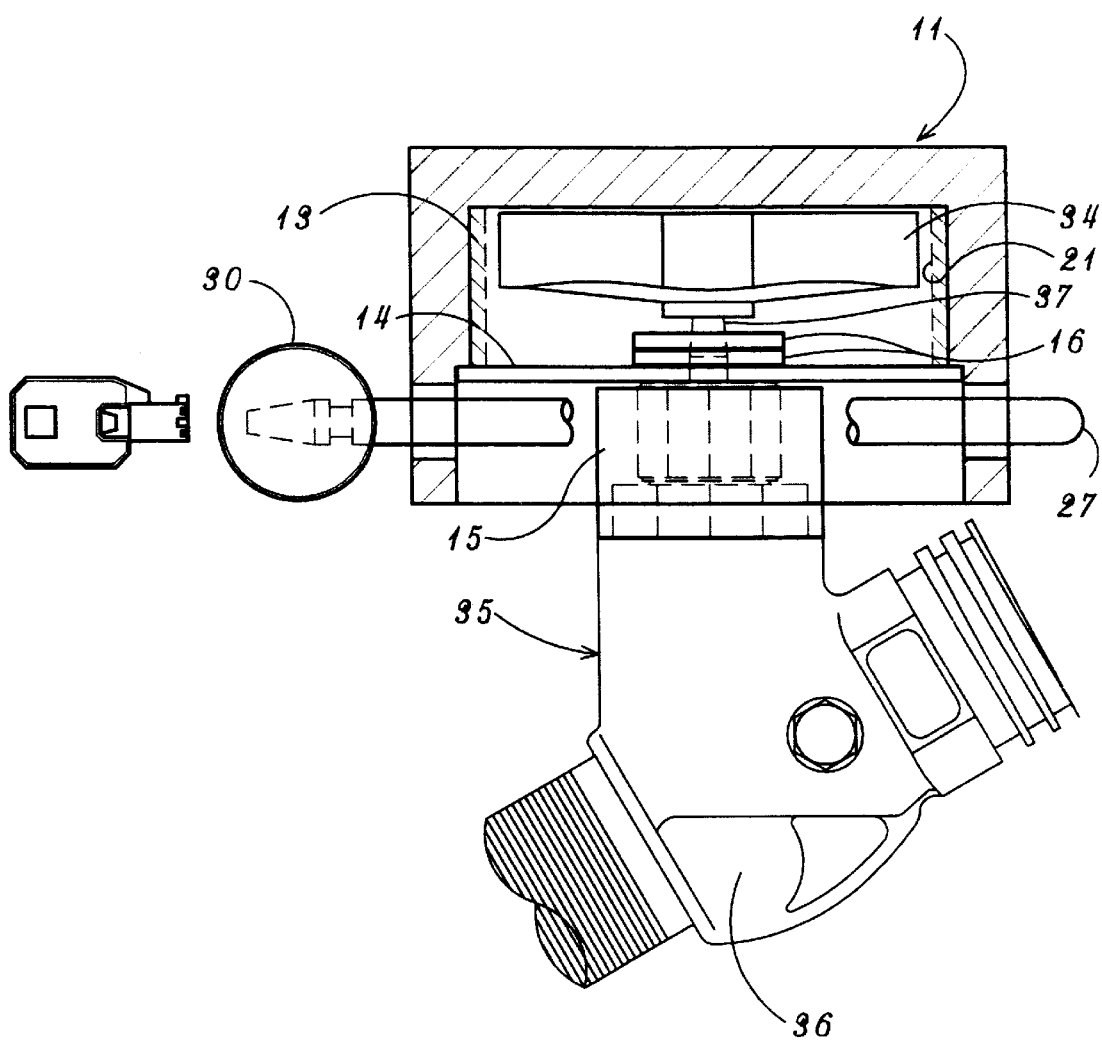
FIG. 3 is a cross-sectional view of the security guard of FIG. 1 assembled in position on the valve assembly of FIG. 2.

With reference now to FIGS. 1, 2 and 3, the cover 11 is generally of a sleeve shape and has a closed outer end 18 and an interior cavity 19 having an open end 20. The interior cavity 19 is in a tiered configuration with a circular shaped inner chamber 21 and an outer circularly shaped chamber 22 having a diameter larger than that of the inner chamber 21 to form an interior ledge 23. As is best shown in FIG. 1, the sidewall 17 of the cover 11 is formed with two pairs of opposed aperture 25 through which the shaft member 12 is disposed, as can clearly be seen from FIGS. 1 and 5–7.

The shaft member 12 is of an elongated U-shaped configuration having a rounded end 27 and opposite free ends 28 and 29 that are designed to coact with a locking bar 30 to secure the shaft member 12 in place. The shaft member 12 and locking bar 30 are manufactured by Kryptonite Corp. and are of a construction well-known in the art.

Referring again to FIGS. 1, 2 and 3, the interior cavity 19 of the cover 11 is designed to serve as a housing for an operating handle 34 of a valve assembly 35 that further includes a valve body 36, a valve stem 37 and locking mounting nuts 38 and 39 for securing the stem 37 with the body 36. As can be seen from FIG. 3, the valve assembly operating handle 34 is received within the inner chamber 21 of the cavity 19. Also enclosed within the inner chamber 21 is the slip ring 13 that is sized for seating in the chamber 21 in such fashion that it is free to rotate relative to the cover 11. The use of the slip ring 13, although not essential to the present invention, is highly desirable as without the slip ring 13, it may be possible to tilt the cover 11 against the handle 34 to obtain unauthorized actuation of such handle. Obviously, the slip ring 13 prevents such unauthorized action by permitting the cover 11 to rotate without actuation of the valve assembly 35.

In like fashion, the shield 14 is also not essential to the present invention but is highly helpful in preventing tampering with the valve assembly 35 by means of the open end 20 of the interior cavity 19. The shield 14 includes a center hole 40 so that the shield can be positioned on the valve stem 37 intermediate the handle 34 and the locking nuts 38 and 39. As can best be seen in FIG. 3, the shield 14 has a diameter approximately equal to the inner diameter of the outer chamber 22 of the cavity 19 and seats against the cover interior ledge 23 to seal off the cavity inner chamber 21.

Figure 4:
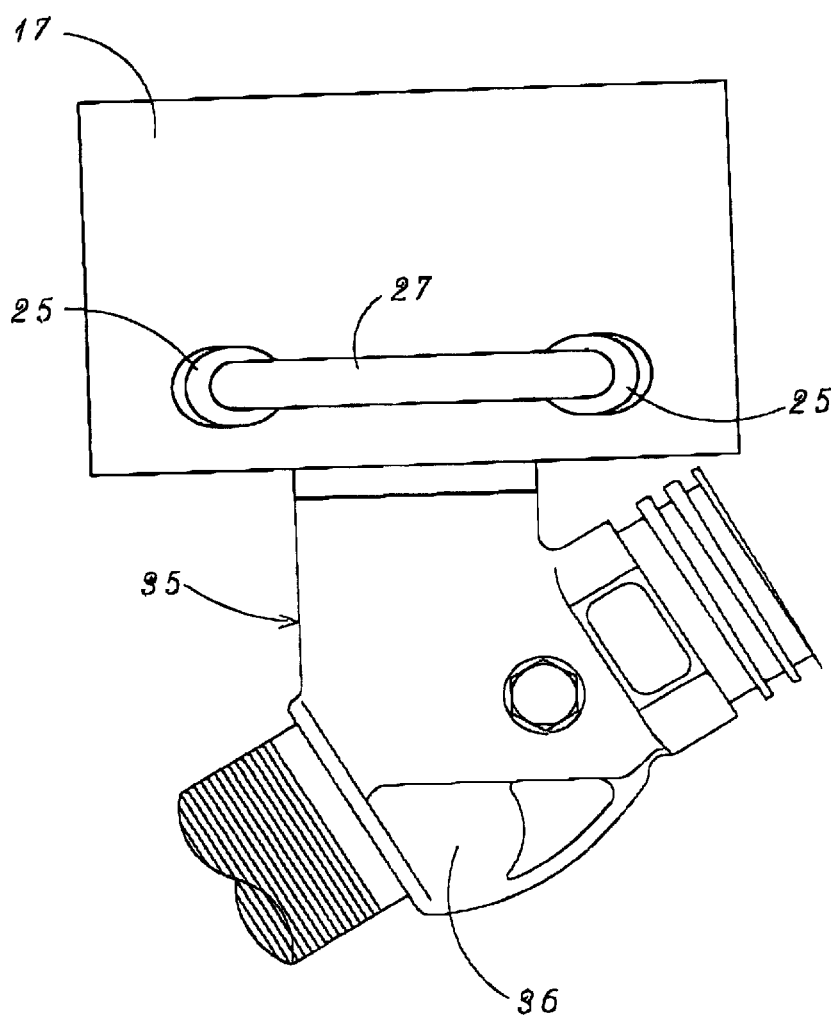
FIG. 4 is a side view of the security guard of FIG. 1 positioned on the valve assembly of FIG. 2.
Figure 7:
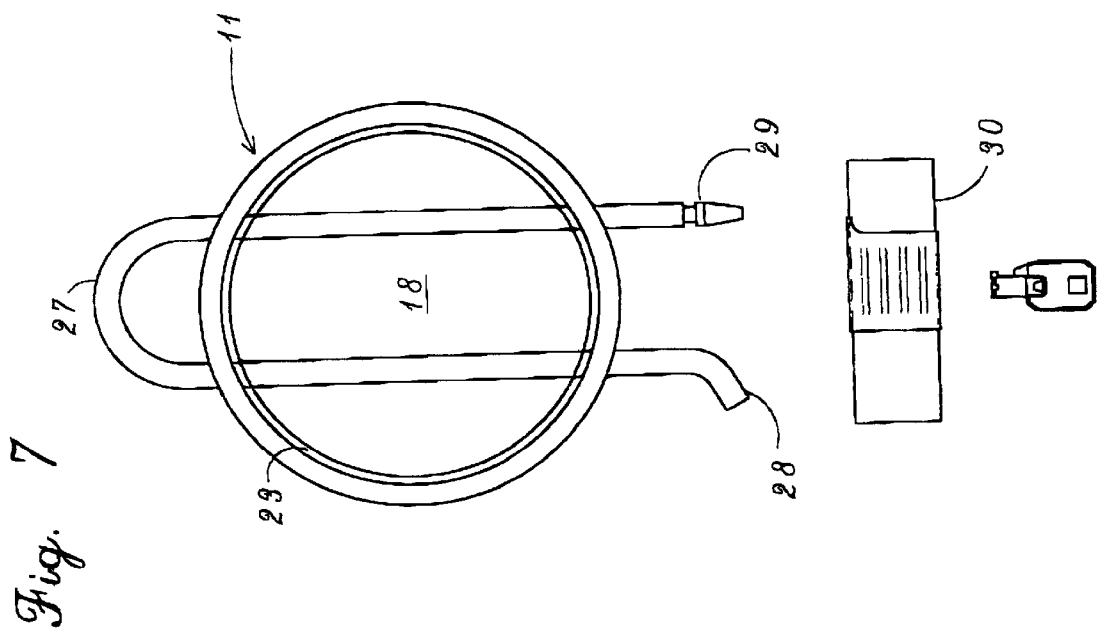
FIG. 7 is a partially exploded plan view of the cover, shaft member and locking bar for the shaft member.
Figure 5:
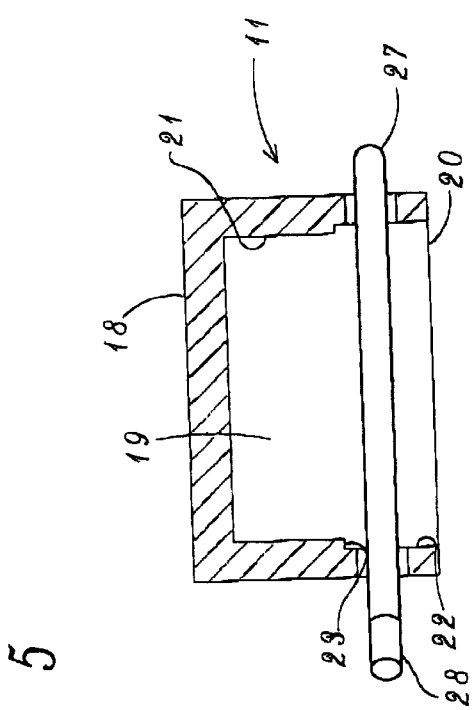
FIG. 5 is a cross-sectional view of a cover and a shaft member forming part of the security guard FIG. 1.
Figure 6:
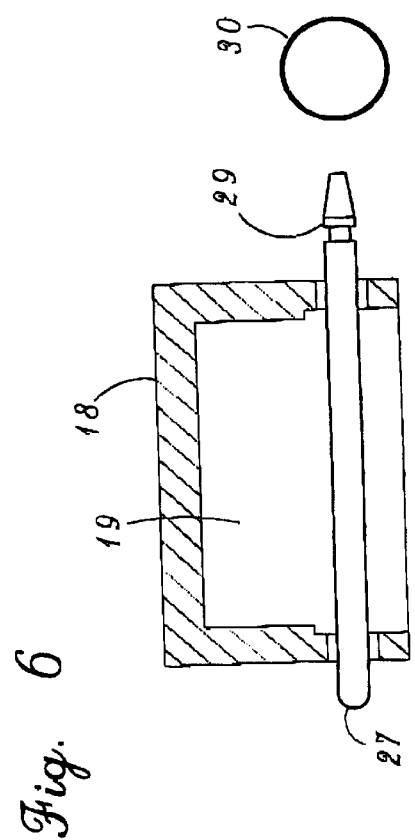
FIG. 6 is a cross-section similar to that shown in FIG. 5 but with the shaft member viewed from opposite side.

The integrity of the security guard 10 is further enhanced through the use of the shield ring 15 that is designed to fit over the locking nuts 38 and 39 and prevent access thereto by unauthorized personnel. The washers 16 serve simply as spacers between the shield 14 and operating handle 34 to maintain the shield 14 in proper position for completely sealing off the inner chamber 21. Accordingly, the security guard of the present invention provides a highly secure means for preventing unauthorized operation of the valve assembly 35, as indicated by FIG. 4.

Although the invention has been described with respect to a preferred embodiment thereof, it is to be understood that it is not to be so limited, since changes and modifications can be made therein which are within the full intended scope of this invention as defined by the appended claims.

What is claimed is:

1. A valve security guard for a storage tank having a valve for dispensing material from the tank, said guard comprising in combination:
    (a) a valve having a valve casing, a valve stem that extends outwardly from the casing and an operating handle at the outer end of said stem;
    (b) a cover with a closed end, a side periphery, apertures on opposite sides of said side periphery and an interior with an open end for enclosing said valve handle; and
    (c) means for securing said cover on said handle and formed of said apertures in said cover and an elongated shaft member that extends through said apertures and is lockable in a fixed position located behind said handle to secure said cover thereon.

2. The valve security guard as recited in claim 1, wherein said cover is generally of a sleeve shape.

3. The valve security guard as recited in claim 2, wherein said cover interior has inner and outer chambers formed in a tiered configuration so that said outer chamber has a diameter greater than said inner chamber to form a circular interior ledge and said handle is received in said inner chamber.

4. The valve security guard as recited in claim 3, wherein said guard further includes a slip ring that is sized to seat within said inner chamber of said cover interior intermediate the valve handle and the periphery of said inner chamber.

5. The valve security guard as recited in claim 3, wherein said guard further includes a shield means with a central opening through which said valve stem can be positioned and is of a size for being received within said outer chamber of said cover interior and seat against said interior ledge to substantially close off said inner chamber.

6. The valve security guard as recited in claim 5, wherein said shield is disk shaped.

7. The valve security guard as recited in claim 1, wherein said valve further includes at least one mounting nut for securing said valve stem in said casing and said security guard further includes a cylindrically shaped member positioned around said mounting nut.

8. The valve security guard as recited in claim 1, wherein said shaft member of said securing means is U-shaped with two free ends and said securing means further includes a locking member that attaches to the free ends of said shaft member.

* * * * *